(12) United States Patent
Dalla Betta (10) Patent No.: US 8,006,484 B2
(45) Date of Patent: Aug. 30, 2011

(54) SYSTEMS AND METHODS FOR REDUCING EMISSIONS OF INTERNAL COMBUSTION ENGINES USING A FUEL PROCESSOR BYPASS

(75) Inventor: Ralph A. Dalla Betta, Mountain View, CA (US)

(73) Assignee: Eaton Corporation, Cleveland, OH (US)

( * ) Notice: Subject to any disclaimer, the term of this patent is extended or adjusted under 35 U.S.C. 154(b) by 1930 days.

(21) Appl. No.: 11/058,615

(22) Filed: Feb. 14, 2005

(65) Prior Publication Data

US 2006/0179822 A1   Aug. 17, 2006

(51) Int. Cl.
*F01N 3/00* (2006.01)
(52) U.S. Cl. ............... 60/288; 60/274; 60/286; 60/287; 60/295; 60/303
(58) Field of Classification Search ............... 60/275, 60/286, 287, 288, 289, 292, 295, 303, 324
See application file for complete search history.

(56) References Cited

U.S. PATENT DOCUMENTS

| | | | |
|---|---|---|---|
| 5,232,357 A * | 8/1993 | Dalla Betta et al. ............... 431/7 |
| 5,349,816 A * | 9/1994 | Sanbayashi et al. ............ 60/277 |
| 5,412,946 A * | 5/1995 | Oshima et al. .................. 60/286 |
| 5,894,728 A | 4/1999 | Wakamoto |
| 5,921,076 A | 7/1999 | Krutzsch et al. |
| 6,009,703 A | 1/2000 | Bouchez et al. |
| 6,026,640 A | 2/2000 | Kato et al. |
| 6,092,512 A | 7/2000 | Ma |
| 6,105,365 A * | 8/2000 | Deeba et al. ..................... 60/274 |
| 6,167,696 B1 | 1/2001 | Maaseidvaag et al. |
| 6,176,078 B1 | 1/2001 | Balko et al. |
| 6,202,407 B1 | 3/2001 | Brusasco et al. |
| 6,318,306 B1 | 11/2001 | Komatsu |
| 6,422,007 B1 | 7/2002 | Hartick |
| 6,449,947 B1 | 9/2002 | Liu et al. |
| 6,484,495 B2 * | 11/2002 | Minami .......................... 60/288 |

(Continued)

FOREIGN PATENT DOCUMENTS

DE    202 18 811 U1    4/2003

(Continued)

OTHER PUBLICATIONS

International Search Report for PCT Application PCT/US2004/014007 filed May 5, 2004, mailed Sep. 8, 2004, six pages.

(Continued)

*Primary Examiner* — Tu Nguyen
(74) *Attorney, Agent, or Firm* — Paul V. Keller (57) ABSTRACT

Described here are systems and methods for reducing emissions of IC engines using a fuel processor bypass. In general, the systems described here include an exhaust pipe, a bypass pipe, a valve, a fuel processor, a fuel injector, and a $NO_x$ trap. When the valve is in the open position, the entire exhaust passes through the bypass pipe. When the valve is in a closed position, the entire exhaust passes through the exhaust pipe. In some variations, the systems described here also comprise a pre-combustor, a thermal mass, a mixer, and/or a DPF. Methods for regenerating or desulfating a $NO_x$ trap are also described. Typically these methods include introducing exhaust into an exhaust pipe, opening a valve located at the inlet of a bypass pipe, injecting fuel upstream of a fuel processor, and introducing a reducing mixture into a $NO_x$ trap. The injection of fuel may be pulsed or continuous.

26 Claims, 4 Drawing Sheets

U.S. PATENT DOCUMENTS

| | | | |
|---|---|---|---|
| 6,499,294 B1 | 12/2002 | Katoh et al. | |
| 6,508,057 B1 | 1/2003 | Bouchez et al. | |
| 6,527,980 B1 | 3/2003 | Roden et al. | |
| 6,557,342 B2 | 5/2003 | Suga et al. | |
| 6,560,958 B1* | 5/2003 | Bromberg et al. | 60/275 |
| 6,576,203 B2 | 6/2003 | Abe et al. | |
| 6,615,580 B1 | 9/2003 | Khair et al. | |
| 6,641,785 B1 | 11/2003 | Neufert et al. | |
| 6,708,484 B2 | 3/2004 | Onodera et al. | |
| 6,713,040 B2 | 3/2004 | Ahmed et al. | |
| 6,745,560 B2* | 6/2004 | Stroia et al. | 60/286 |
| 6,758,035 B2 | 7/2004 | Smaling | |
| 6,763,658 B2 | 7/2004 | Colignon | |
| 6,775,973 B2* | 8/2004 | Liu et al. | 60/301 |
| 6,807,807 B2* | 10/2004 | Kagenishi | 60/288 |
| 6,845,610 B2* | 1/2005 | Shiino et al. | 60/286 |
| 6,895,746 B2* | 5/2005 | Buglass et al. | 60/286 |
| 6,964,156 B2* | 11/2005 | Liu et al. | 60/274 |
| 6,968,680 B2* | 11/2005 | van Nieuwstadt et al. | 60/288 |
| 7,165,393 B2* | 1/2007 | Betta et al. | 60/286 |
| 7,181,906 B2* | 2/2007 | Dalla Betta et al. | 60/286 |
| 7,213,395 B2* | 5/2007 | Hu et al. | 60/286 |
| 7,216,481 B2* | 5/2007 | MacBain et al. | 60/286 |
| 7,377,101 B2* | 5/2008 | Mital et al. | 60/275 |
| 7,386,977 B2* | 6/2008 | Ancimer et al. | 60/286 |
| 2001/0055550 A1 | 12/2001 | Taga et al. | |
| 2002/0062641 A1 | 5/2002 | Shiino et al. | |
| 2002/0121461 A1 | 9/2002 | Ueda et al. | |
| 2003/0005686 A1 | 1/2003 | Hartick | |
| 2003/0070425 A1 | 4/2003 | Kokusyo et al. | |
| 2003/0101713 A1 | 6/2003 | Dalla Betta et al. | |
| 2003/0221413 A1 | 12/2003 | Buglass et al. | |
| 2004/0006975 A1 | 1/2004 | Stroia et al. | |
| 2004/0050037 A1 | 3/2004 | Betta et al. | |
| 2004/0098977 A1 | 5/2004 | Kupe et al. | |
| 2006/0010859 A1* | 1/2006 | Yan et al. | 60/286 |

FOREIGN PATENT DOCUMENTS

| | | |
|---|---|---|
| EP | 0 537 968 A1 | 4/1993 |
| EP | 0 893 154 A2 | 1/1999 |
| EP | 1 008 379 A1 | 6/2000 |
| EP | 1 094 206 A2 | 4/2001 |
| EP | 1 211 394 A2 | 6/2002 |
| EP | 1 434 103 A2 | 6/2004 |
| JP | 63-068714 | 3/1988 |
| JP | 03-196839 A | 8/1991 |
| JP | 09-317440 | 12/1997 |
| WO | WO-01/34950 A1 | 5/2001 |
| WO | WO-01/34959 A1 | 5/2001 |
| WO | WO-03/048536 A1 | 6/2003 |
| WO | WO-2004/031549 A1 | 4/2004 |
| WO | WO-2004/046514 A1 | 6/2004 |

OTHER PUBLICATIONS

Majewski, W. A. (2001). "NOx Adsorbers," *DieselNet Technology Guide: Diesel Catalysts* retreived from <http://www.dieselnet.com> 13 pages total.

Matsumoto, S. (2000). "Catalytic Reduction of Nitrogen Oxides," *CATTECH* 4(2):102-109.

Molinier, M. (2001). "$NO_x$ Adsorber Desulfurization Under Conditions Compatible With Diesel Applications," *ASEC Manufacturing/Delphi Automotive Systems* pp. 79-85.

Yamazaki, K. et al. (2001). "Effect of the Addition of Transition Metals to $Pt/Ba/Al_2O_3$ Catalyst on the $NO_x$ Storage-Reduction Catalysis Under Oxidizing Conditions in the Presence of $SO_2$," *Applied Catalysis B: Environmental* 30:459-468.

International Search Report for PCT Application PCT/US2006/004744 filed Feb. 10, 2006, mailed May 23, 2006, five pages.

* cited by examiner

SYSTEMS AND METHODS FOR REDUCING EMISSIONS OF INTERNAL COMBUSTION ENGINES USING A FUEL PROCESSOR BYPASS

FIELD

This invention relates generally to internal combustion ("IC") engines, and more particularly to systems and methods that use a fuel processor bypass for improving the performance and emission control of IC engines that produce nitrogen oxides ("$NO_x$") emissions.

BACKGROUND

Due to increasingly strict governmental emission regulations, efforts to reduce emissions from IC engines have increased. These regulations have posed, and will continue to pose, particular problems for diesel engines, which while being very efficient, often produce very high emissions of $NO_x$ and particulate matter ("PM"). After treatment of diesel engine exhaust is often needed to help reduce diesel engine emissions, because diesel engine emissions cannot be sufficiently reduced by modification of the engine design alone. This after treatment typically includes the use of a diesel particulate filter ("DPF") and/or a $NO_x$ trap.

The DPF is typically a ceramic filter placed in the exhaust stream. The PM, which primarily consists of carbon particulates, collects in, and on, the DPF and clogs the filter causing increased backpressure that reduces engine efficiency or makes the system inoperable. Thus, the DPF must be regenerated to maintain its effectiveness.

A $NO_x$ trap is typically placed in the exhaust stream and has an absorbent that absorbs the $NO_x$ from the exhaust stream. When the absorbent has reached its maximum absorbing capacity, no more $NO_x$ will be absorbed. Thus, like the DPF, the $NO_x$ trap must be regenerated to maintain its effectiveness.

DPF regeneration usually occurs when the carbon particulates collected in, and on, the DPF are combusted when the DPF temperature rises past a minimum threshold. This increase in DPF temperature is typically a direct result of an increase in exhaust temperature when the engine is operated at high load. However, when engine operation does not provide engine exhaust temperatures high enough to regenerate the DPF, the exhaust stream or the DPF must be heated by other methods. For example, fuel may be injected into the exhaust stream and combusted on the DPF or on a fuel combustor placed upstream of the DPF to heat the exhaust stream. However, the use of fuel for this purpose results in an increased fuel penalty.

A $NO_x$ trap typically contains an absorbent-catalyst system that provides the multiple functions of $NO_x$ trapping, $NO_x$ release, and $NO_x$ reduction. Total $NO_x$ emissions are decreased by operating the $NO_x$ trap in one or more cycles, each consisting of trapping and regeneration cycles. Usually one component of the $NO_x$ trap absorbs $NO_x$ from the exhaust stream during the trapping cycle under oxidizing conditions, or conditions where the exhaust stream contains excess oxygen. This component is typically selected so that when the exhaust stream is made reducing, that is, the exhaust stream composition is adjusted to contain excess reductant (e.g., fuel hydrocarbons, carbon monoxide, hydrogen, etc.) relative to oxygen, the $NO_x$ is released. The $NO_x$ trap also contains a $NO_x$ reduction catalyst upon which $NO_x$ reacts with a reducing agent under reducing conditions to form non-polluting $N_2$. Thus, during the regeneration cycle, when the exhaust stream is made reducing, $NO_x$ is released and reacts with the reducing agent on the reduction catalyst to form $N_2$.

As noted above, the $NO_x$ trap environment must be made reducing in order to convert the trapped $NO_x$ to $N_2$. Similar to the DPF regeneration mentioned above, fuel may be injected into the exhaust stream and combusted on the $NO_x$ trap or on an upstream fuel processor in order to raise the temperature of the $NO_x$ trap, if required, consume the oxygen, and to produce the reducing environment. See for example Applicant's copending U.S. patent application Ser. Nos., 10/431,171 and 10/309,936, each of which is hereby incorporated by reference in their entirety. As described in these cases, using a fuel processor placed upstream of the $NO_x$ trap works well and can achieve reasonable fuel penalties when the fuel processor is designed to have a low heat capacity, or when the $NO_x$ trapping time between regenerations is made long. However, fuel penalty may increase when fuel processors having high heat capacities are used, or when the $NO_x$ trapping time between regenerations is short. In addition, these designs may only be effective for a limited range of exhaust temperatures.

Accordingly, it would be desirable to provide improved systems and methods for regenerating a $NO_x$ trap. Similarly, it would be desirable to provide systems and methods that could reduce the fuel penalty associated with emissions control and $NO_x$ trap regeneration. It would further be desirable to provide systems and methods that could provide such a reduced fuel penalty over a wide range of exhaust temperature conditions.

SUMMARY

Described here are systems and methods for reducing emissions of IC engines using a fuel processor bypass. Advantageously, these systems and methods may provide for a reduced fuel penalty during operation, and hence a greater fuel efficiency. In general, the systems described here comprise an exhaust pipe, a bypass pipe, a valve, a fuel processor, a fuel injector, and a $NO_x$ trap. The exhaust pipe is configured to allow exhaust from an upstream engine to pass therethrough. It connects to a bypass pipe and comprises an inlet and an outlet, both of which are connected to the exhaust pipe, and defines a lumen adapted for the passage of gas therethrough.

The valve is located at the inlet or outlet of the bypass pipe and is configured to move between an open and a closed position. When the valve is in an open position, the inlet and outlet of the bypass pipe are open and the entire exhaust passes through the bypass pipe. When the valve is in a closed position, the inlet or outlet of the bypass pipe is closed and the entire exhaust passes through the exhaust pipe. The fuel processor is typically positioned in the bypass pipe between the inlet and outlet. It comprises an inlet, an outlet, a catalytic element, and defines at least one lumen adapted for the passage of gas therethrough. The fuel injector is typically located upstream of the fuel processor and is configured to inject fuel upstream of the fuel processor. In some variations, the fuel injector is an engine cylinder fuel injector. The $NO_x$ trap is typically located in the exhaust pipe downstream of the bypass pipe outlet.

In some variations, the systems described here also comprise a pre-combustor located upstream of the fuel processor and downstream of the fuel injector. The pre-combustor typically comprises a support material having at least two adjacently disposed longitudinal channels for the passage of gas therethrough, and at least a portion of the inner surface of at least one longitudinal channel is typically coated or impregnated with a catalytic material. The pre-combustor may be of any suitable size, for example, it may be about 0.05 to about 1 times the volume of the fuel processor. The hydraulic diameter of the pre-combustor support material channels may be about 0.2 mm to about 10 mm.

Similarly, the support material of the pre-combustor may be made of any suitable material. For example, it may be made at least in part from an iron-based metal alloy or at least in part from an alloy containing aluminum. The support material may also comprise a washcoat of zicronia, titania, alumina, silica, lanthana, ceria, calcium oxide, barium oxide, chromia, or mixtures thereof. The catalytic material of the pre-combustor may comprise palladium, platinum, or mixtures thereof.

The systems described here may also comprise a thermal mass located downstream of the fuel processor and upstream of the $NO_x$ trap. Similarly, the systems described here may also comprise a particulate filter, and/or a sulfur trapping material. The particulate filter and/or sulfur trapping material is typically located downstream of the bypass pipe outlet.

The catalytic element of the fuel processor may comprise any suitable catalytic material. For example, it may comprise Ni, Rh, Pd, Pt, or mixtures thereof. Similarly, the catalytic element may be made of any suitable material. For example, it may be made of a material selected from the group consisting of ceramic, metal, or mixtures thereof. The metal may consist of an iron-based metal alloy or at least in part from an alloy containing aluminum. In some variations, the catalytic element is monolithic, and in some variations, the catalytic element has a wall thickness in the range of 10 to 500 microns. The fuel processor may further comprise an insulating mat, or a radiation barrier, to help prevent heat loss.

Methods for regenerating or desulfating a $NO_x$ trap in a system having a fuel processor bypass are also described here. Typically these methods comprise introducing exhaust into an exhaust pipe, opening a valve located at the inlet of a bypass pipe, injecting fuel upstream of a fuel processor, and introducing a reducing mixture into a $NO_x$ trap. The exhaust pipe is typically connected to a bypass pipe, which comprises an inlet and an outlet, both of which are connected to the exhaust pipe, and defines a lumen adapted for the passage of gas therethrough.

The valve is configured to move between an open and a closed position, and when the valve is open, the entire exhaust flows through the bypass pipe. The fuel processor is typically positioned in the bypass pipe. The fuel processor comprises an inlet, an outlet, a catalytic element, defines at least one lumen adapted for the passage of gas therethrough, and produces a reducing mixture of CO and $H_2$. The $NO_x$ trap is typically located downstream of the bypass pipe outlet.

The exhaust that is introduced into the exhaust pipe may, e.g., be compression-ignited engine exhaust or spark-ignited engine exhaust. The fuel that is injected upstream of the fuel processor, may e.g., comprise hydrocarbons or mixtures including hydrocarbons (e.g., fuel blends). In some variations the fuel is selected from the group consisting of gasoline and diesel fuel.

The methods described here may also comprise introducing the exhaust into a pre-combustor, wherein the pre-combustor is located downstream of the fuel injector, and upstream of the fuel processor. Suitable pre-combustors were briefly described above. The methods may also comprise introducing the reducing mixture into a particulate filter prior to introducing it into the $NO_x$ trap. In some variations, the fuel processor is operated until the catalytic element is at a temperature greater than about 500° C., but less than about 800° C.

Methods for reducing emissions using a system having a fuel processor bypass are also described here. In general, these methods comprise introducing exhaust into an exhaust pipe, introducing exhaust into a $NO_x$ trap, opening a valve, injecting fuel upstream of a fuel processor, which produces a reducing gas mixture, and introducing the reducing mixture into the $NO_x$ trap.

The exhaust pipe is connected to a bypass pipe, and the bypass pipe comprises an inlet, an outlet, and defines a lumen adapted for the passage of gas therethrough. The $NO_x$ trap is typically located downstream of the bypass pipe outlet, and comprises an inlet, an outlet, a $NO_x$ absorbing material, and defines a lumen for the passage of gas therethrough. $NO_x$ in the exhaust are absorbed by the absorbing material. The valve is located at the inlet of the bypass pipe and is configured to move between an open and a closed position. When the valve is open, the entire exhaust flows through the bypass pipe, and when the valve is closed, the entire exhaust flows through the exhaust pipe. Fuel is typically injected into the bypass pipe upstream of a fuel processor, which is located in the bypass pipe and downstream of the valve. However, fuel can also be injected in the exhaust pipe upstream of the bypass inlet since when the valve is open, the fuel would then flow into the bypass pipe and to the fuel processor. The fuel injection can be done by injectors on the engine and can be done by the engine cylinder fuel injectors. This may be done, for example, by injecting fuel after the main engine combustion fuel has been combusted. Such an injection is typically called a late cycle injection or a post cycle injection. This fuel is swept out of the cylinder and into the exhaust line by the exhaust leaving the cylinder. The fuel processor typically comprises an inlet, an outlet, a catalytic element, defines at least one lumen adapted for the passage of gas therethrough, and produces a reducing mixture of CO and $H_2$. The $NO_x$ trap is located downstream of the fuel processor.

The methods for reducing emissions described here may also comprise closing the valve. In some variations, closing the valve maintains the temperature of the catalytic element of the fuel processor between a temperature ranging from about 300° C. to about 800° C.

DETAILED DESCRIPTION

I. Systems

Figure 1:
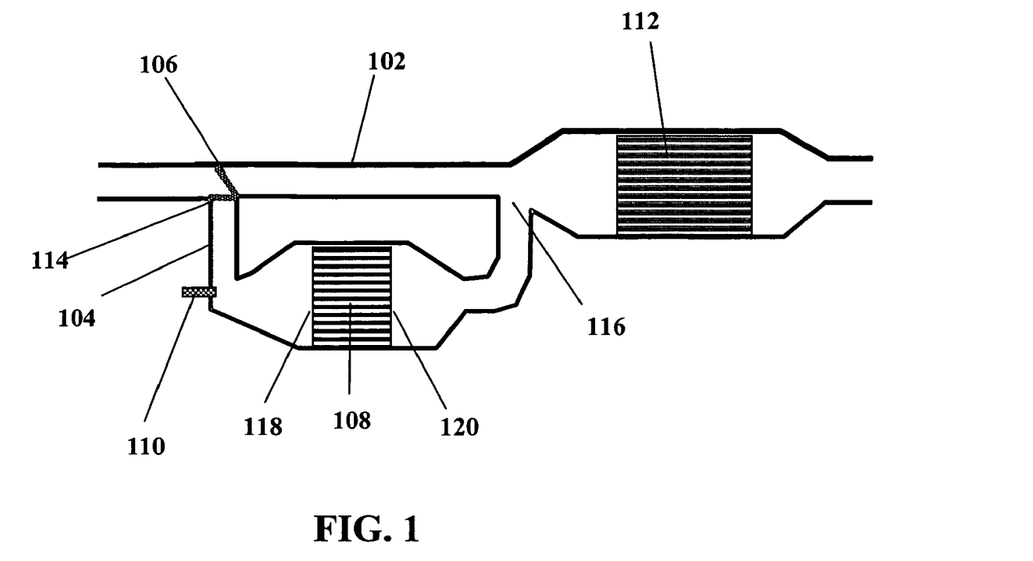
FIG. 1 depicts an exemplary fuel processor bypass system as described herein.

Described here are systems and methods for reducing emissions of IC engines using a fuel processor bypass. In general, the systems described here comprise an exhaust pipe, a bypass pipe, a valve, a fuel processor, a fuel injector, and a $NO_x$ trap. For example, shown in FIG. 1 is system (100) comprising exhaust pipe (102), bypass pipe (104), valve (106), fuel processor (108), fuel injector (110), and $NO_x$ trap (112). The exhaust pipe (102) is configured to allow exhaust from an upstream engine to pass therethrough. It connects to bypass pipe (104), at the bypass pipe inlet (114) and outlet (116). As shown by FIG. 1, the bypass pipe (104) defines a lumen adapted for the passage of gas therethrough.

In the example configuration shown in FIG. 1, the valve (106) is located at the inlet (114) of the bypass pipe and is configured to move between an open and a closed position. When the valve is in the open position, the inlet (114) of the bypass pipe (104) is open and the entire exhaust passes through the bypass pipe (104). When the valve is in a closed position, the inlet of the bypass pipe is closed and the entire exhaust passes through the exhaust pipe. The valve may be any valve suitable for the purposes described herein. For example, the valve may be a standard flapper valve, a diverter, etc.

The fuel processor (108), which will be described in more detail below, is typically positioned in the bypass pipe (104) downstream of the valve (106), when the valve is positioned in the bypass pipe inlet, as shown in FIG. 1. In an alternative configuration, the valve may be located at the outlet of the bypass and the fuel processor located upstream of the valve. The fuel processor comprises an inlet (118), an outlet (120), a catalytic element (not shown), and defines at least one lumen adapted for the passage of gas therethrough. The $NO_x$ trap (112) will also be described in greater detail below. In general, the $NO_x$ trap (112) is typically located in the exhaust pipe downstream of the bypass pipe outlet (116).

The fuel injector (110) is typically located upstream of the fuel processor (108) and is configured to inject fuel upstream of the fuel processor (108). While the fuel injector depicted in FIG. 1 is positioned in the bypass pipe (104), it need not be. Indeed, the fuel injector may be placed anywhere upstream of the fuel processor. In fact, in some variations, the fuel injector is an engine cylinder fuel injector (not shown).

In general, the systems described here are typically used to reduce emissions of $NO_x$ in an exhaust stream, and are particular advantageous to regenerate or desulfate a $NO_x$ trap, or both. Accordingly, many suitable system configurations are possible. For example, the system may further comprise a pre-combustor, a mixer, a DPF, a thermal mass, or some combination or selection of all four.

Figure 2:
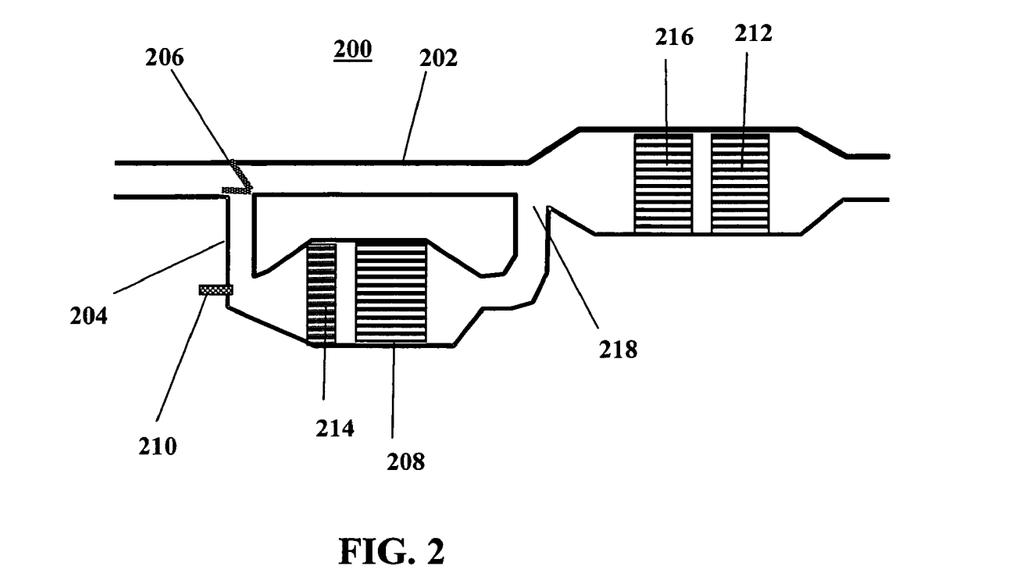
FIG. 2 depicts a fuel processor bypass system having an optional pre-combustor and an optional DPF.

For example, FIG. 2 depicts a system suitable for use with the methods described herein, having additional optional components. Shown in FIG. 2 is system (200) comprising exhaust pipe (202), bypass pipe (204), valve (206), fuel processor (208), fuel injector (210), and $NO_x$ trap (212). Here, system (200) also comprises pre-combustor (214) and DPF (216). The components of the system may be packaged together as a single unit, or may be packaged as individual components, which are then connected together. Exemplary pre-combustors, mixers, fuel processors, $NO_x$ traps, DPFs, and thermal masses suitable for use with the described systems and methods, will now be described.

A. Pre-Combustor

In general, the pre-combustor may be used to provide a substantially uniform fuel air mixture at a fuel processor inlet, to provide a substantially uniform temperature at a fuel processor inlet, to combust fuel to heat up the fuel processor, or to help provide a rich reducing gas mixture for $NO_x$ trap regeneration or desulfation. The pre-combustor may also be configured to provide combinations of these functions. Accordingly, in some variations, the pre-combustor comprises a support material and has at least two adjacently disposed longitudinal channels (not shown) for passage of a gas therethrough.

The longitudinal channels have inner surfaces, and in some variations, at least a portion of the inner surfaces of at least the first channel is coated or impregnated with a catalytic material, and at least a portion of the second channel is not coated with a catalytic material. For example, in some variations, the pre-combustor is formed of a corrugated foil, which is coated with a catalytic material on one side and then rolled into a spiral fashion so as to form a monolithic structure containing channels coated with catalytic material and channels not coated with catalytic material. The fraction of channels coated with catalytic material can vary from about 5% to about 95% and in some variations from about 20% to about 80%. If a herringbone corrugated foil is coated on one side with catalytic material and then folded in half and rolled into a spiral configuration, 50% of the channels will be coated with catalytic material and 50% will not be coated with catalyst. Such a structure would have the ability to combust very non-uniform fuel concentrations since the catalytic material-coated surface will be cooled by the surface not coated with catalytic material. In addition, such monolithic structures formed by rolling catalytic material coated foils would have adjacent layers that are not bonded together and would allow adjacent layers to slip and move both axially and circumferentially with respect to each other. Such movement would make the structure very tolerant of thermal gradients within the monolithic structure since thermal gradients would cause gradients in thermal expansion and localize stress if the structure cannot relieve this stress. Such a loose non-bonded structure could be significantly more tolerant to rapid thermal transients and to thermal gradients caused by non-uniform fuel concentrations. Alternatively, the metal structure could be formed into a monolithic structure prior to coating and then coated with the washcoat and catalyst. This preformed monolithic structure could be bonded by brazing or otherwise attaching the corrugated layers together. Subsequent coating with the catalyst layer could be coated onto a portion of the channels or surfaces to obtain essentially the same type of structure as that obtained by coating the corrugated metal on one side and then rolling in a spiral fashion.

Illustrative pre-combustors suitable for use with the systems and methods described herein are provided in U.S. Pat. Nos. 5,250,489 and 5,512,250, each of which is hereby incorporated by reference herein in their entirety. For example, the pre-combustor may be comprised of a platinum-group, metal-based catalytic material on a metal support.

Metallic supports may be in the form of honeycombs, spiral rolls of corrugated sheet (which may, for example, be interspersed with flat separator sheets), columns (or "handful of straws"), or other configurations having longitudinal channels or passageways permitting high space velocities with a minimal pressure drop. Metallic supports are typically more desirable than ceramic supports, but ceramic supports may be used as well. The catalytic material is deposited, coated, impregnated, or otherwise placed, on at least a portion of the inner walls of the longitudinal channels (i.e., within the metal supports' channels or passageways). By the phrase "at least a portion" it is meant that each channel need not be coated along its entire length, or over the entire channel surface at any location along it length. In some instances catalytic material deposition along a portion of the length of the channel will be sufficient. Exemplary metallic support materials include, for example, aluminum, aluminum-containing or aluminum-treated steels, ferrous alloys, certain stainless steels, and any metal alloy stable at high temperature, including nickel or cobalt alloys where a layer containing catalytic material can be deposited on the metal surface. Exemplary aluminum-containing steels suitable for use with the pre-combustors described herein are those found in U.S. Pat. No. 4,414,023 to Aggen et al., U.S. Pat. No. 4,331,631 to Chapman et al., and U.S. Pat. No. 3,969,082 to Cairns et al. These steels, as well as others sold by Kawasaki Steel Corporation (RIVER LITE 20-5 SR), Allegheny Ludlum Steel (ALFA I AND II), and Engineered Material Solutions (DURAFOIL), contain sufficient dissolved aluminum so that, when oxidized, the aluminum forms alumina whiskers, crystals, or a layer on the steel's surface to provide a rough and chemically reactive surface for better adherence of a washcoat.

The pre-combustor support may further comprise a washcoat. The washcoat may be applied using an approach such as is described in the art, e.g., the application of gamma-alumina, zirconia, silica, or titania materials (preferably sols) or mixed sols of at least two oxides containing aluminum, calcium, silicon, titanium, zirconium, and additives such as barium, cerium, lanthanum, chromium, or a variety of other components. In some variations, zirconia sol or suspension is used as the washcoat. Other refractory oxides, such as silica and titania, are also suitable. The washcoat may be applied by any suitable method, e.g., by spraying, by direct application, by dipping the support into a sol of the washcoat material, etc. The catalytic material for combustion or fuel processing can be applied after the washcoat has been coated on the support, or it can be added to the washcoat and applied to the support in a single step.

Aluminum supports are also suitable for use with the pre-combustors described herein and may be treated or coated in essentially the same manner as described above for the general metallic supports. The pre-combustors may be made by cold rolling or otherwise processing a long sheet or strip of metal to corrugate it. This corrugated strip may be combined with a flat metal strip and rolled in a spiral to form a cylindrical catalyst structure through which gas can flow. Rather than rolling, the corrugated and flat (or spacer) strips may be cut or folded and placed together to form structures. Alternatively, Chapman et al. in U.S. Pat. No. 4,331,631 teaches the use of a herringbone corrugation pattern, which when folded or doubled and rolled into a spiral, will form an open corrugated structure without the use of a flat metal strip and will not nest. The monolithic structure can be bonded by brazing or otherwise fixing the corrugated metal layers together.

The pre-combustor can be of any suitable size. For example, it can be in the range of about 0.05 to about 1 times the volume of the fuel combustor. In some variations the pre-combustor is about 0.1 to about 0.7 times the volume of the fuel combustor, and in other variations, the pre-combustor is about 0.2 to about 0.4 times the volume of the fuel combustor, where the volume of the combustor and pre-combustor is defined as the volume of the coated monolithic catalyst structure subtended by the inlet face; the outlet face and the cylindrical outer diameter for a unit, such as a combustor and pre-combustor. Similarly, the pre-combustor can have passages or channels of any suitable hydraulic diameter. Typically, the channel hydraulic diameter of the pre-combustor is larger than the channel hydraulic diameter of the fuel processor, but it need not be. The hydraulic diameter ($D_h$) is defined as the quantity is four times the average cross-sectional area of all of the channels of a particular type, e.g., catalytic material-coated channels, in the catalyst structure divided by the average wetted perimeter of all of the channels of that type in the catalyst structure. The hydraulic diameter is typically equal to the geometric diameter in the case of circular channels, but will vary in the case of non-circular channels. In this way, the variable geometry of the channels is accounted for. The hydraulic diameter of the catalytic material-coated channels can be different from the hydraulic diameter of the non-coated channels. In some variations, the hydraulic diameter of the pre-combustor channels is in the range of about 0.2 mm to about 10 mm. In other variations, the hydraulic diameter of the pre-combustor channels is in the range of about 0.5 mm to about 7 mm, or about 1 mm to about 5 mm. The pre-combustor may also be electrically heated, or configured to be heated by the passage of an electrical current therethrough.

As will be described in more detail below, the pre-combustor is generally located downstream of a fuel injector and upstream of the fuel processor. In some variations, the pre-combustor is located downstream of the bypass pipe inlet and upstream of the fuel processor, so that when operating in a lean, $NO_x$ trapping cycle (without exhaust flow through the bypass pipe), the pre-combustor retains heat, and the temperature of the pre-combustor decreases slowly. In some variations, it may be particularly advantageous to position the pre-combustor so as to allow sufficient space between the pre-combustor and the fuel processor so that maximum gas mixing before the exhaust stream enters the fuel processor is realized.

The pre-combustor can also be insulated, or an insulating mat or radiation barrier may be used to help reduce heat loss from the pre-combustor during the lean $NO_x$ trapping cycle. Similarly, the pre-combustor may be designed and constructed so that it has a low heat capacity, e.g., to aid in rapid temperature rise.

B. Mixers

The system may further comprise a mixer located upstream of the fuel processor, or upstream of the pre-combustor, to help facilitate mixing of the injected fuel with the air from the exhaust stream. The mixer may thus help to produce a more uniform fuel air mixture.

The fuel to be injected may take the form of a vapor, a liquid, or a combination of the two. If the injected fuel is a liquid, then some or all of it may be vaporized when contacted by the hot exhaust gas mixture. In the case of diesel fuel, a substantial portion of the fuel will be in the form of liquid droplets, and at low exhaust temperatures, these droplets will not evaporate rapidly. In these variations, the pre-combustor may be especially useful in vaporizing a substantial portion of the injected liquid fuel. Mixing may also be used to further accelerate this vaporization. The mixer may be any suitable mixer that promotes mixing of gases and/or aids the vaporization of liquid droplets.

In one variation, a static (i.e., having no moving parts), in-line mixer is used. In this variation, the mixer acts by changing the flow of the exhaust stream and injected fuel, causing mixing. Various types of static mixers are commercially available and may be used. For example, one type of static mixer has an array of intersecting channels that split the stream into portions, which portions are then rearranged and combined. Other types of mixers include swirlers and counter-rotating swirlers, which impart a swirl to the gas mixture. The swirler may have a portion rotating in one direction and another portion rotating in the opposite direction. Pipe sections may also be used as mixers. For example, straight pipe sections with a length/inner diameter ratio ($L/D_i$) greater than 2, or bent pipe sections may be used.

Alternatively, the mixer may have moving parts such as fans, turbines, or acoustic energy input devices, which induce turbulence or mixing within the gas streams. Such mixers may be less desirable, however, since the moving parts may wear and require service and may also require a greater energy input. Accordingly, it may be desirable to evaluate any improvement in mixing efficiency before determining whether a non-static mixture is sufficiently advantageous to tolerate the additional design complexity and energy consumption.

Sometimes varnish or carbonaceous deposits form on the mixer parts that are in contact with fuel spray, especially if the fuel has a high molecular weight and is prone to pyrolysis. Varnish is a hydrocarbon-like coating formed by partial pyrolysis of the diesel fuel. Accordingly, at least a part of the mixer may be coated with a catalyst capable of catalyzing an oxidation reaction to oxidize these varnish or carbonaceous deposits. In this way, the catalyst prevents or removes the deposits, much like a continuous-cleaning or self-cleaning oven.

Fuel injectors may also be used to help with mixing. In one variation, fuel injectors are located upstream of a fuel combustor and are used in combination with a length of pipe to mix the gas mixture uniformly. The section of pipe length necessary to perform this function is generally thought to be about two to about ten times the pipe diameter. The fuel injectors may also be located upstream of a bend in the exhaust pipe to further mix the fuel and air. In some instances, it may be desirable to mix the fuel and air quickly or within a short distance prior to introduction into the pre-combustor. This is because heavy fuels (e.g., diesel fuels) are prone to pyrolysis or decomposition and produce varnish or other deposits, which may in turn lead to the degradation of the system.

Similarly, one or more perforated plates or screens may be used to mix the exhaust stream and injected fuel mixture, or to direct the mixture flow in a desired direction. Any number of perforated plates may be used, and the use of additional perforated plates is thought to increase the mixture uniformity. However, the use of additional perforated plates may result in an increase pressure drop, which may be undesirable since it could reduce engine output power.

C. Fuel Processor

As shown in FIG. 1, the fuel processor (108) comprises an inlet (118), an outlet (120) and a catalytic element (not shown). In addition, the fuel processor defines at least one lumen adapted for the passage of gas therethrough. The fuel processor may also comprise a second fuel injector for the introduction of air or additional fuel (not shown) therein.

The catalytic element of the fuel processor may comprise a single catalyst or may comprise several catalysts in series. For example, a first catalyst may be designed primarily as an oxidation catalyst with a catalyst composition selected to react with some of the fuel and oxygen to form carbon dioxide and water and to generate heat. Excess fuel and/or fuel injected between catalyst units could then pass to a second catalyst unit where the excess fuel could react with water and carbon dioxide to form CO and $H_2$. This second catalyst may be designed primarily as a reforming catalyst for example. Alternatively, a single catalyst can be designed having an inlet section for oxidation and an outlet section for reforming. In this way, a single catalyst is provided that effectively functions as two separate catalyst units.

The catalytic element may comprise one or more metals or oxides as the active catalytic material combined with a high surface area refractory support, many of which are well known in the art for oxidation of hydrocarbons. The catalyst may be applied as a washcoat, a porous coating typically comprising a mixture of a high surface area support and active catalytic materials. Alternatively, the washcoat may comprise a support with a porous structure that has a second oxide portion or a mixture of oxides active for the oxidation of hydrocarbons or carbon. The coating may be applied using any number of processes. For example, it may be applied using plasma flame spraying, chemical vapor deposition, electroplating, electroless plating, or by application of a sprayable sol (comprising a suspension of the catalyst particles in a liquid). The washcoat may also be applied by dipping the parts into a slurry. One example of a catalyst composition that may be used with the systems and methods describe here is provided in U.S. Pat. No. 5,232,357 to Dalla Betta et al., which is hereby incorporated by reference in its entirety.

The catalytic element of the fuel processor may, e.g., comprise pellets or beads in a container, or may be a monolithic honeycomb-type unit. A monolithic honeycomb unit may be desirable because vehicle vibration may cause abrasion and loss of pellet or bead material. Additionally, monolithic units typically have a lower pressure drop for the flowing exhaust stream. Any monolith may be used. For example, the monolith may be ceramic, may be metal, or may be some combination thereof. In addition, the monolith may have a variety of cell sizes and shapes. Determination of the cell size and shape is typically dependent on the desired surface area and pressure drop, as well as the relevant heat and mass transfer coefficients. For example, it may be desirable that the fuel processor catalytic element have a low heat capacity so it can heat up quickly. Similarly, it may be desirable that the fuel processor catalytic element have a low pressure drop so that the overall pressure drop of the entire system does not present a hindrance to operation or reduce the efficiency of the engine. In some variations, the thickness of the walls in a monolithic-type unit is in the range of 10 to 130 microns.

When a monolithic structure is used, its external or wall surfaces may be coated with a layer of catalyst. This catalyst may include a washcoat comprising zirconia, titania, alumina, silica, lanthana, ceria, calcium oxide, barium oxide, chromia, or mixtures thereof, and having a highly exposed surface area. This oxide washcoat may contain additional catalytic materials active for oxidation or reforming depending on the desired function. Preparation and composition of various monolithic catalysts for use with the present invention are described in U.S. Pat. Nos. 5,183,401, 5,259,754, and 5,512,250 to Dalla Betta et. al., each of which are hereby incorporated by reference in their entirety.

The oxidation catalyst may comprise any catalytic material capable of oxidizing hydrocarbons. For example, the oxidation catalyst may comprise elements selected from any of Groups 6 through 11 of the periodic table of the elements (International Union of Pure and Applied Chemistry Periodic Table of the Elements, dated Nov. 7, 2003). The more active catalytic elements may be selected from the group Pd, Pt, Ir, Rh, Cu, Co, Fe, Ni, Cr, and Mo. In some instances, it may be more desirable to use Pd, Pt, Rh, Co, Fe, or Ni, which may be used separately or in combination and may further exist as the element or the oxide in actual use.

One property of the oxidation catalyst that may be desirable is that it has high catalytic activity at very low temperatures. In this way, oxidation can be initiated at low exhaust temperatures without modification of the system design. The temperature at which the fuel and oxygen in the exhaust reacts at a sufficient rate for the gas temperature to rise significantly is often referred to as "light off" temperature. A light off temperature below 250° C., and usually below 200° C., is typically desirable.

The oxidation catalyst may further comprise washcoats comprising zirconia, titania, alumina, silica, lanthanum oxide, cerium oxide, calcium oxide, barium oxide, chromium oxide, or mixtures and combinations thereof, with or without additional components or elements, on which the active catalytic materials is deposited by various methods known in the art. Examples are cerium zirconium oxide mixtures or solid solutions, silica alumina, calcium, barium, silicon, or lanthanum-stabilized alumina, as well as others well known in the art. Since diesel fuel with a high molecular weight has a propensity to pyrolyze at high temperatures, the catalyst may also contain catalytic materials active for steam cracking of the hydrocarbon fuel. Possible additives may include basic oxides such as calcium oxide, barium oxide, other alkali or alkaline earth oxides and rare earth oxides. The catalyst can be made by coating or impregnating Pd, Pt, Rh, Ni, or any other active catalytic material within a porous support such as alumina or zirconia. The metal loading could be in the range of 0.1 to 20% by weight, and more desirably, in the range of 1 to 10% by weight. Several illustrative catalysts that may be used with the systems and methods described here include those described in U.S. Pat. No. 5,232,357 to Dalla Betta et al., which is hereby incorporated by reference in its entirety.

The reforming catalyst may similarly use a high surface area support with added active catalytic materials. For example, the reforming catalyst may comprise catalytic materials Ni, Rh, Pd, Pt. The catalyst may be selected so that it is capable of remaining stable under normal lean oxidizing conditions and then responding very quickly to the addition of fuel under rich conditions so that $H_2$ and CO are thereby produced. In this respect, it may be desirable to use Pt, Pd and Rh supported on a porous oxide support.

For example, a typical reforming catalyst may comprise 1% Rh by weight supported on a porous zirconium oxide support. This may be accomplished by dissolving rhodium trichloride in water and then impregnating the solution onto a solid zirconium oxide support having a high surface area (e.g., ranging from 15 $m^2/g$ to 150 $m^2/g$). The rhodium concentration may typically be in the range of 0.1 to 20% by weight of the total washcoat catalyst solid. More typically, the rhodium concentration may be in the range of 0.5 to 5% of the total washcoat loading. The washcoat may be coated onto the interior channels of a monolithic honeycomb structure at a loading thickness of 1 to 50 $mg/cm^2$ or more typically, in the range of 5 to 15 $mg/cm^2$. Catalysts comprised of Pd or Pt may be prepared in a similar manner with the metal concentration in the range of 0.1% to 20% by weight and preferably in the range of 1% to 10% by weight.

The oxidation and reforming catalysts may be combined in the same monolithic unit by combining in the washcoat both the oxidation and reforming components. For example, the active oxidation catalyst Pd and the active reforming catalyst Rh may be combined on a zirconia support to form a catalyst having the oxidizing activity to react the fuel with the oxygen and the reforming activity necessary to reform the remaining fuel to CO and $H_2$. Alternatively, the Rh component may be added to a high surface area support and calcined or fixed. Separately the Pd may be coated onto a high surface area support and calcined or fixed. These catalysts may also be mixed together to form a Pd/Rh catalyst and this mixed catalyst then coated onto a monolithic substrate.

The fuel processor may also incorporate a sulfur trapping material. This sulfur trapping material would function by adsorbing sulfur during the lean trapping cycle, possibly retaining the sulfur as a sulfate. During the regeneration cycle, the fuel processor catalyst is heated to a high temperature, in the range of 500° C. to 800° C., and then the exhaust composition is made rich by the injection of additional fuel. During this rich period, the sulfate is decomposed and the sulfur is released as hydrogen sulfide, sulfur dioxide, or as a mixture of these compounds. This desorbed sulfur will pass out of the fuel processor catalyst in the rich exhaust mixture and a portion or substantially all of the sulfur will pas through the $NO_x$ trap and not be retained on the $NO_x$ trap. Examples of suitable sulfur trapping materials include oxides or compounds of lithium, sodium, potassium, rubidium, cesium, magnesium, calcium, strontium, barium, the rare earth elements, Group 8, 9, 10, 11, and 12 elements, or a mixture of these. The alkali and alkaline earth elements and zinc are particularly preferred.

As will be described in more detail below, the fuel processor may also comprise an insulating mat, and/or a radiation barrier to help prevent heat losses.

D. $NO_x$ Trap

The systems described here comprise a $NO_x$ trap. $NO_x$ traps typically comprise an absorbent-catalyst structure (e.g., a canister), which is placed in the exhaust stream and enables the exhaust stream to flow therethrough. Typical absorbent-catalysts are honeycomb like, monolithic structures having the absorbent. and catalyst components coated onto their surfaces or walls.

As noted above, when the absorbent in the catalyst becomes saturated with $NO_x$, the adsorption becomes less complete and the $NO_x$ level exiting the $NO_x$ trap begins to increase. At this point, regeneration is required. To regenerate, the composition of the exhaust stream is changed from an oxidizing to a reducing mixture, and the regeneration cycle begins. A reducing agent is introduced, and the $NO_x$ is desorbed from the absorbent and is reduced to nitrogen by the catalytic components of the $NO_x$ trap. When the $NO_x$ desorption and reduction is largely complete, the exhaust stream composition is returned to an oxidizing mixture and the trapping cycle of the emissions control cycle is initiated. FIG. 1 shows a $NO_x$ trap (112) located in the exhaust pipe downstream of the bypass pipe outlet (116), and FIG. 2 shows a $NO_x$ trap (212) located downstream of a DPF (216).

E. DPF

The systems described herein may further comprise a DPF. The DPF may be used in combination with any of the components described herein. FIG. 2 shows one illustrative variation in which filter or trap (216) is a DPF. In this variation, DPF (216) is located downstream of bypass pipe outlet (218) and upstream of $NO_x$ trap (212). Alternatively, a DPF may be located downstream of a $NO_x$ trap, which is in the exhaust pipe downstream of the bypass pipe outlet. The DPF may be made of cordierite, silicon carbide, metal or any other material with a design that will trap and remove particulate soot from the exhaust flow. A typical DPF is a ceramic flow-through honeycomb structure with porous channel walls and alternate channels plugged at the outlet and inlet so that the gas flow is directed to flow through the walls whereby the particulate material is filtered from the exhaust flow.

Other designs are possible. However, in all such designs, the particulate soot is trapped within the filter and with time can plug the filter resulting in increased backpressure and thus requiring regeneration by combustion of the trapped soot. The DPF may also be a simple ceramic or metal filter in which regeneration is accomplished by heating the filter in the presence of an oxygen containing exhaust flow, to a temperature at which the soot combusts.

Alternatively, oxidation of the soot may also be accomplished with the aid of a catalyst applied to the filter surface. This can act to lower the soot combustion temperature so that regeneration will occur at lower temperatures.

F. Thermal Mass

A thermal mass, or heat-absorbing component, may be used to help control the system operation, and in particular, to help moderate the temperature between the fuel processor and a $NO_x$ trap. This may be useful, because while the optimal operating temperature range for the fuel processor might be quite high, the optimal operating temperature range for the $NO_x$ trap might not be, because, e.g., a $NO_x$ trap may perform best at lower temperatures and could be deactivated at high temperatures.

Any number of thermal mass configurations are possible for use with the systems described here and any number of thermal masses may be employed. For example, in one variation, the systems described herein may further comprise a thermal mass located downstream of the fuel processor, and upstream of the $NO_x$ trap. During the $NO_x$ regeneration cycle, the fuel processor temperature may increase to 600° C. or more. The exhaust gas will pass through the thermal mass and will be cooled by heat exchange with the thermal mass, thus limiting the exposure of the $NO_x$ trap to a high temperature exhaust. The thermal mass may be a ceramic or metallic honeycomb structure with sufficient heat capacity to limit the heating of the $NO_x$ trap catalyst.

This thermal mass may also be a DPF positioned downstream of the bypass pipe outlet, and upstream of the $NO_x$ trap, or it may be a separate thermal mass component located downstream of the fuel processor and upstream of the $NO_x$ trap. When a DPF is used as the thermal mass, the $NO_x$ trap may be more easily maintained at a constant temperature since the DPF is generally very large and has a high thermal mass. One advantage of this design is that the heat generated by the pre-combustor and fuel processor may be used to heat up and regenerate the DPF by helping to burn off the carbonaceous soot, as described in more detail below.

The thermal mass may be made of any suitable material. For example, it may be ceramic or it may be metal. In some variations, it has a high heat capacity and a low pressure drop to ensure that the pressure drop across the entire system does not hinder system operation. The optimal range of heat capacity of the thermal mass is a function of at least the gas flow rate and the desired temperature rise, and thus may be selectively controlled. In another variation, the $NO_x$ trap itself may be designed with a high heat capacity.

II. Methods

A. Methods for Regenerating a $NO_x$ Trap

Described here are methods for regenerating a $NO_x$ trap in a system having a fuel processor bypass. Typically these methods comprise introducing exhaust into an exhaust pipe, opening a valve located at the inlet or outlet of a bypass pipe, injecting fuel upstream of a fuel processor, and introducing a reducing mixture into a $NO_x$ trap.

Making reference to FIG. 1, the methods for regenerating a $NO_x$ trap will be further described. For example, as shown in FIG. 1, the exhaust pipe (102) is connected to bypass pipe (104). Exhaust from an upstream engine is introduced into exhaust pipe (102). The exhaust that is introduced into the exhaust pipe may, e.g., be compression ignition engine exhaust or spark ignited engine exhaust. During the $NO_x$ trapping cycle of engine operation, valve (106) is in the closed position allowing the exhaust gas to flow through the exhaust pipe (102) and the $NO_x$ trap (112), but not through the bypass pipe (104). As described above, the $NO_x$ from the exhaust gas are absorbed by the $NO_x$ trap so that they are not introduced into the environment. However, once the $NO_x$ absorbent reaches its maximum capacity, no additional $NO_x$ can be absorbed, and the $NO_x$ trap must be regenerated.

When the $NO_x$ trap is ready for regeneration, the valve (106) is opened, which allows the exhaust to flow through the bypass pipe (104) and fuel processor (108), but not through exhaust pipe (102). This begins the regeneration cycle. Fuel injector (110) is used to inject fuel upstream of fuel processor (108), which in the example shown in FIG. 1, is positioned in the bypass pipe (104), downstream of the valve (106). The fuel processor (108) comprises an inlet (118), an outlet (120), a catalytic element, and defines at least one lumen adapted for the passage of gas therethrough. When the catalytic element is heated to an operable temperature range (e.g., 600° C.-750° C.), the engine conditions may be changed to lower the concentration of $O_2$ in the exhaust. The injected fuel to the fuel processor is increased to give a rich mixture. The fuel and exhaust mixture then flow into the fuel processor (108), where a portion of the fuel reacts with oxygen, while the remaining fuel reacts with water and $CO_2$ to form a reducing mixture of CO and $H_2$ as described in more detail below.

The $NO_x$ trap (112) is typically located in the exhaust pipe downstream of the bypass pipe outlet (116). At the time valve (106) is opened, and the fuel processor is operating in rich mode, it is possible to deliver a reducing mixture into the $NO_x$ trap (112) so that it may be regenerated. During this process, the $NO_x$ is reduced to benign nitrogen gas ($N_2$). At the completion of this regeneration cycle, the fuel injection is terminated, the valve (106) is closed, and the system returns to the next $NO_x$ trapping cycle. During the $NO_x$ trapping cycle, there is essentially no exhaust flow through the fuel processor. Since there is essentially no flow through the fuel processor, the temperature of the catalytic element of the fuel processor remains high, dropping very slowly over time. When the next regeneration cycle is required, the process is repeated. However, on the second and subsequent regenerations, the fuel processor catalytic element is already hot, so that there is little to no heat up time required and very little fuel is required to heat up the fuel processor to the required operating temperature.

On this second and subsequent regenerations, the valve (106) is again opened, and fuel is injected upstream of the fuel processor (108) to combust the remaining oxygen in the exhaust and to generate the $H_2$ and CO required for regeneration of the $NO_x$ trap. Again, because the catalytic element remains hot, there is very little, if any, time required for sufficient heat-up. Thus, there is minimum, if any, fuel required to heat up the fuel processor. This results in a decreased fuel penalty and, therefore, increased fuel efficiency. In addition, when the fuel processor is already hot, the time to perform the regeneration is reduced.

An insulating layer, e.g., an insulating mat, may be placed between the catalytic element and the wall of the fuel processor container, or around the outside of the fuel processor container itself, to help maintain the temperature of the catalytic element at operating conditions. In addition, because radiation may contribute to the loss of heat from the inlet and outlet face of the fuel processor, a radiation barrier may be provided at the inlet and/or outlet face of the fuel processor.

Typically, the regeneration occurs with sufficient speed so that the reduction cycle is relatively short, while at the same time permitting sufficient time to elapse so that a significant fraction of the $NO_x$ absorption capacity is regenerated. Typically, the absorption cycle lasts anywhere from 1 to 5 minutes at high load and possibly as high as 20 minutes at low load or idle. With use of the bypass, the regeneration-reduction cycle typically lasts anywhere from 1-10 seconds, and typically regenerations can be accomplished in 2-3 seconds and even in as little as 1 second or less.

The fuel injected upstream of the fuel processor may be any fuel compatible with the system, e.g., the fuel may comprise hydrocarbons or mixtures that include hydrocarbons (e.g., fuel blends). In some variations the fuel is selected from the group consisting of gasoline and diesel fuel. The fuel may also be the same type of fuel as used in the upstream engine.

The fuel may be injected either continuously or intermittently, for the duration of the regeneration cycle of engine operation. In the case of continuous fuel injection, the rate and duration of the fuel flow controls the fuel quantity. In the case of intermittent fuel injection, the pulse frequency, rate of fuel flow, and pulse duration control the fuel quantity.

The injection of the fuel in several discrete rich and lean pulses may be advantageous, for example, when the systems described herein are used with exhaust streams containing high levels of oxygen, as described in Applicant's copending U.S. patent application Ser. No. 10/431,171 filed on May 6, 2003, which sections describing the pulsed injection of fuel are hereby incorporated by reference in their entirety. For example, with exhaust streams containing 5-20% oxygen, and more often with exhaust streams containing from 8 (±2%) to 15% (±2%) oxygen pulsed fuel injection may be used to generate rich cycles for the regeneration of $NO_x$ trap catalysts.

When operating at high exhaust oxygen levels, any number of pulses may be used per regeneration cycle, for example, 1 to 20 pulses. Similarly, the length of each pulse may be selected so that the temperature of the catalytic element will remain high during the pulsing series, but will not become so high as to cause the catalytic element to overheat. For example, the pulses could be from 0.1 to about 2 seconds in length. In addition, the time interval between pulses may be varied depending on the mode of engine operation, and the design of the catalytic element in the fuel processor and the exhaust flow rate being treated. At low engine rpm where the exhaust flow rate is low, the pulses can be farther apart since the lower gas flow rate cools the catalytic element more slowly. The pulses may be from 0.5 second to 20 seconds apart. At higher rpm where the exhaust flow rate is higher, the pulses may be closer together, from 0.1 to 3 seconds apart. Such rapid control of fuel injection is made possible by the use of a pressurized fuel injector, which may be electronically controlled, and can be turned on and off very rapidly, typically in less than 1 millisecond. Typically the duration between pulses is sufficiently long to allow the fuel processor time to cool down so that overheating is avoided, but sufficiently short so that the temperature of the fuel processor remains between about 500° C. and about 800° C.

The quantity of fuel injected is typically sufficient to react with all of the excess oxygen present in the exhaust stream and to generate the required amount of reducing gas mixture (CO and $H_2$) at the operating temperature of the $NO_x$ trap catalyst system. This quantity of fuel corresponds to an equivalence ratio (O) greater than 1. The equivalence ration is the fuel concentration divided by the theoretical fuel concentration needed to fully react with all the oxygen present in the gas mixture to form $CO_2$ and $H_2O$.

As noted above, mixers may be used to help produce a more uniform fuel air mixture, or a mixture having a resulting equivalence ratio ($\phi$) within any desired limit. For example, if the pre-combustor, and fuel combustor are to be used to reduce the oxygen concentration in the exhaust to zero (e.g., before it enters a $NO_x$ trap), then the level of mixing will determine the required mixture equivalence ratio. If the mixer produces a mixture at the fuel combustor inlet of +/−10% uniformity then fuel may be added to give an equivalence ratio of 1.1 so that the lowest equivalence ratio at the catalyst is 1.0. Similarly, for the portion of the fuel combustor operating rich to produce $H_2$ and CO, the mixture uniformity will likely be determined by the required equivalence ratio and the required temperature to obtain the necessary reforming performance. In general, mixture uniformity from +/−20% is desirable, while +/−10% is more desirable, and +/−6% is most desirable.

The reducing mixture comprised of $H_2$ and CO can be formed by a variety of reactions. For example, a portion of the fuel may be combusted on a pre-combustor to raise the fuel processor temperature to approximately 500° C. to 700° C., while the remaining fuel reacts with $H_2O$ and $CO_2$ in the exhaust stream or formed by the initial fuel combustion to produce the desired $H_2$ and CO. Alternatively, the fuel, $O_2$, $H_2O$, and $CO_2$ can react simultaneously within the fuel processor to yield the desired $H_2$ and CO.

In some situations, it may be desirable that the $NO_x$ trap not be heated too high in temperature since this may damage it or drive it out of its desired operating range for absorption. As described above, this may be accomplished by placing a thermal mass downstream of the fuel processor. In this way, the thermal mass may absorb heat from the fuel processor outlet stream during the high temperature fuel processing cycle and reduce the gas stream temperature prior to entering the $NO_x$ trap. As described above, the thermal mass may be a separate thermal mass, may be part of the $NO_x$ trap, or may be a DPF.

The methods described here may also comprise first introducing the exhaust into a pre-combustor as shown by (214) in FIG. 2. The pre-combustor is located downstream of the fuel injector (210) and upstream of the fuel processor (208). Suitable pre-combustors are described above. In addition, the methods may also comprise introducing the reducing mixture into a DPF (216) prior to introducing it into the $NO_x$ trap (212). In some variations, the fuel processor (208) is operated until the catalytic element is at a temperature greater than about 500° C. and less than about 800° C., and then switched off by terminating fuel injection, and optionally, closing valve (206).

Figure 5:
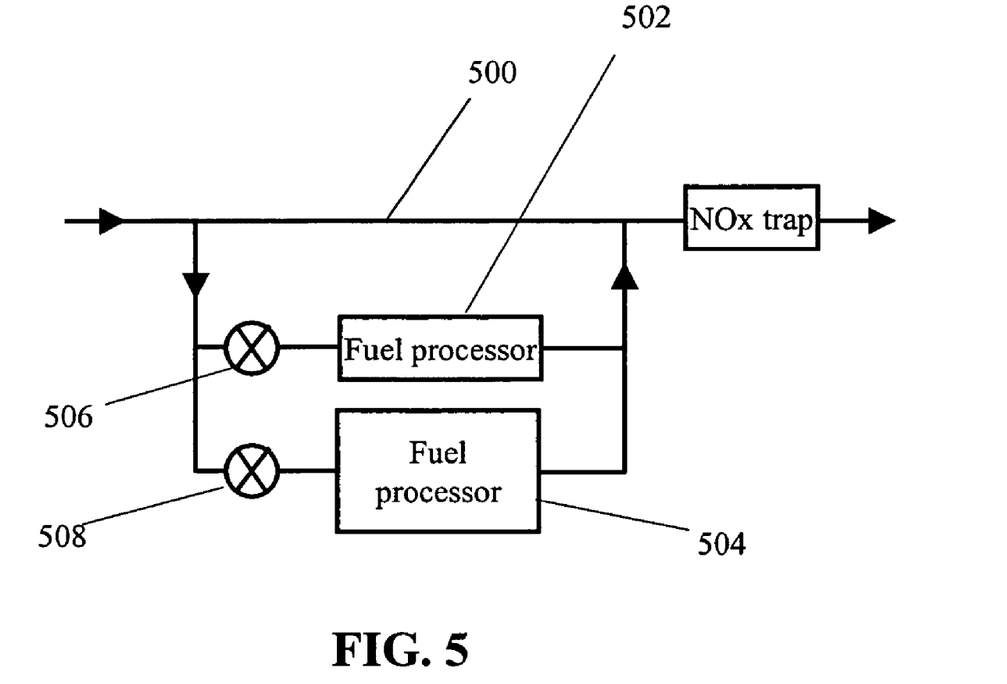
FIG. 5 shows a system comprising two fuel bypass pipes.
Figure 6:
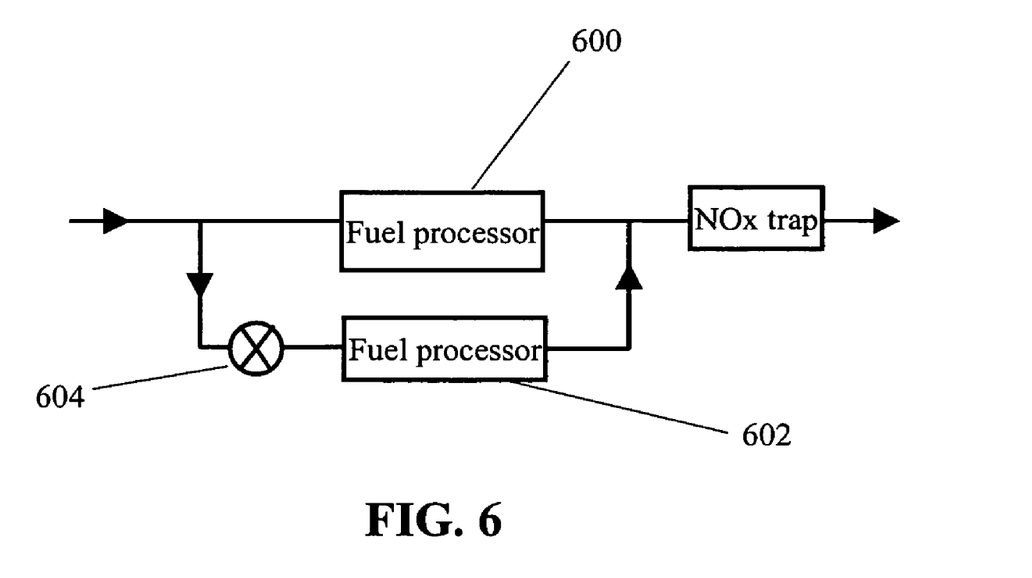
FIG. 6 shows a system comprising two fuel processors, one in the exhaust pipe and one in the bypass pipe.

Other bypass systems suitable for use with the methods described here are shown in FIGS. 5 and 6. FIG. 5 shows a main exhaust pipe (500) with fuel processor units (502) and (504) located in separate bypass legs or pipes, each with a separate valve (506) and (508) respectively. This arrangement could allow one fuel processor to be designed for high exhaust flow and a second fuel processor to be designed for low exhaust flow. The fuel processor designed for low flow, for example (502) could be designed to stay hot as described above and could be designed with a high heat capacity and low heat loss. This fuel processor would be operated on every cycle or on a substantial portion of the regeneration cycles to maintain a high fuel processor temperature. The second fuel processor (504) could be designed to operate at high exhaust flow when the exhaust gas is at high temperature and could be designed with low thermal mass for rapid start up. Alternatively, both fuel processors could be operated as described above and maintained at high temperatures for use in regenerating the $NO_x$ trap as needed. The fuel processor can be maintained at high temperature by periodic operation of the fuel processor or by partially, or quickly opening the bypass valve and injecting fuel to raise the fuel processor temperature.

In FIG. 6, the exhaust gas always flows through fuel processor (600) and a valve (604) controls the flow through fuel processor (602). Fuel processor (602) could be operated in the manner described earlier in which the valve (604) is closed after the fuel processor (600) is hot to maintain fuel processor (602) hot and provide start up capability at low exhaust gas temperatures. Fuel processor (600) can then also be used at high gas flow when larger amounts of exhaust flow must be processed and larger amounts of reductant must be generated. Again, fuel processor (600) could be designed for rapid startup and fuel processor (602) could be designed to retain heat and to remain at high temperature.

B. Methods for Facilitating $NO_x$ Trap Desulfation

Methods for facilitating the desulfation of a $NO_x$ trap are also provided. Sulfur in engine fuel produces sulfur oxides (e.g., $SO_2$ or $SO_3$) in the exhaust stream. These sulfur oxides ("$SO_x$") can react with the components of the $NO_x$ trap to form sulfates, which in turn can deactivate it. While typical levels of sulfur in fuel are relatively low, making the deactivation of the trap take anywhere from hours to weeks (corresponding to 100's to 1000's of miles of engine usage), the trap must be able to work far longer than this.

One method of desulfation of the system is accomplished by operating the fuel processor to produce an outlet gas stream having a temperature in the range of about 500° C. to about 800° C. This stream may then be used to heat a downstream $NO_x$ trap to a temperature in the range of about 500° C. to about 700° C. When the $NO_x$ trap is heated to a desired temperature, the fuel flow to the fuel processor and the engine throttle may be adjusted to produce $H_2$ and CO and to reduce the oxygen concentration exiting the fuel processor. This reducing gas mixture will then desulfate the $NO_x$ trap by decomposing the sulfates and other species that have caused its deactivation. This hot reducing gas mixture can be maintained until the desulfation is complete. In one variation, the regeneration temperature range for the $NO_x$ trap is from about 300° C. to about 800° C. and more typically, from about 500° C. to about 700° C. In addition, the $H_2$ and CO reducing agent can be fed to the $NO_x$ trap for desulfation as a continuous long reducing pulse or as many short pulses.

The systems and methods described herein may be further understood with reference to the following non-limiting examples.

Example 1

System Operation with Reduction in $O_2$ Level

Figure 3:
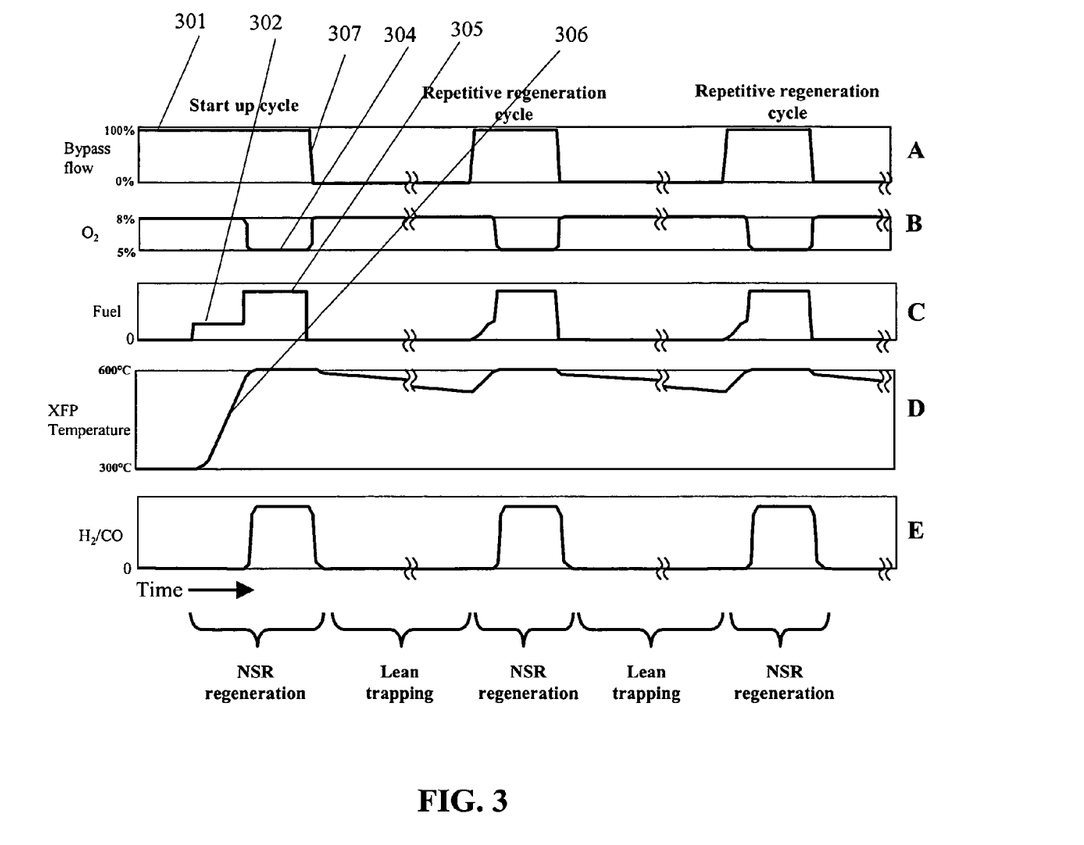
FIGS. 3A-3E provide a representation of the operation of a fuel processor bypass system in which the exhaust oxygen level is adjusted during the regeneration cycle.

FIG. 3 shows the operation of a system similar to those systems shown in FIGS. 1 and 2, where the fuel processor is in a bypass leg or pipe. In FIG. 3, time is shown on the horizontal axis, and a number of operating parameters such as bypass flow, exhaust $O_2$ level, fuel processor fuel flow, fuel processor temperature, and $H_2$/CO production are shown on the vertical axis. In this example, the system is started up with the exhaust flow through the bypass leg as shown by the flow through the bypass curve (301) in panel A. Fuel is injected into the fuel processor as shown by the fuel flow rate curve (302) shown in panel C to heat up the fuel processor as shown by temperature of the fuel processor (303) shown in panel D to a temperature in the range of 500° C. to 800° C. When the fuel processor is at the desired temperature, the exhaust $O_2$ level is reduced to about 5% as shown by the $O_2$ concentration curve, (304) in panel B. Fuel processor fuel is then adjusted to obtain the desired rich condition (305) where upon the fuel processor converts a portion of the fuel to $H_2$ and CO (306) shown in panel E. This rich condition is maintained until the required amount of $H_2$ and CO has been produced at which point the fuel processor fuel is stopped. The valve controlling the bypass is then switched to stop flow through the bypass and the fuel processor (307). Since the exhaust gas flow through the fuel processor is very small or zero, the temperature of the fuel processor decreases at a slow rate. The bypass flow is maintained low during the lean trapping cycle as the $NO_x$ trap traps the $NO_x$ in the exhaust stream. When the $NO_x$ trap becomes full, it is regenerated in a similar fashion, but now the fuel processor is at a high temperature and only a small amount of fuel is needed to heat the fuel processor to the required operating temperature. The bypass control valve is switched to direct the exhaust flow through the fuel processor, some additional fuel is injected to raise the fuel processor temperature, the exhaust $O_2$ level is adjusted to approximately 5% and the fuel injection rate is adjusted to obtain the required rich condition and produce $H_2$ and CO, which flows to the downstream $NO_x$ trap. These lean trapping and regeneration cycles are repeated to control the $NO_x$ emissions to the required level.

During the period when the valve is opened or closed to switch the flow through or around the bypass, fuel may be injected to maintain or adjust the temperature of the fuel processor catalyst unit. In addition, the bypass valve can be modulated, that is, the rate of opening or closing of the valve can be controlled or the valve can be partially opened and then fully opened, or partially closed and then fully closed, to allow more precise coordination of any fuel injection with the valve opening to control the fuel processor temperature as the exhaust flow is switched from one leg to the other leg of the bypass system. The exhaust $O_2$ level can also be adjusted to the desired level by throttling the intake air flow to the engine, by increasing the flow rate of EGR (exhaust gas recirculation) or by both. Also, the duration during which the exhaust oxygen level is adjusted can cover the entire bypass regeneration cycle or only a portion of this cycle. The fuel processor temperature is shown to be, 600° C. for illustration only. Other temperatures are possible.

Example 2

System Operation with no Reduction in $O_2$ Level

Figure 4:
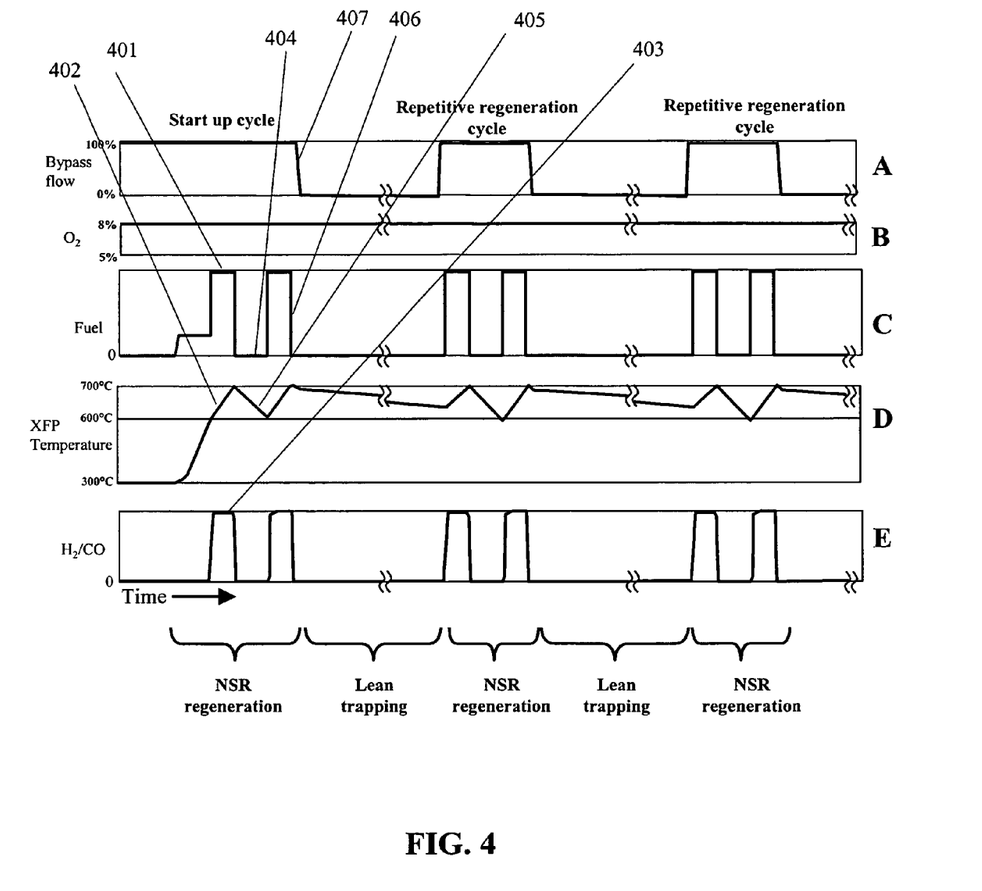
FIGS. 4A-4E depict the operation of a fuel processor bypass system with a high exhaust oxygen level during $NO_x$ trapping and regeneration cycles.

Another method of operating the bypass systems described herein is shown in FIG. 4 where the exhaust oxygen level is not adjusted, but instead, remains relatively high throughout operation. This method is similar to the method shown in FIG. 3, except that after heat up of the fuel processor, the required fuel flow of the injected fuel used to obtain the desired rich condition to produce the desired level of $H_2$ and CO is higher, as shown by (401). This is because the $O_2$ level is high and more fuel is needed to react with the large amount of $O_2$ in the exhaust. The combustion of fuel with this high level of $O_2$ results in a high heat generation causing the temperature to rise rapidly as shown by the curve at (402). Also, during rich operation, a pulse of reductant $H_2$ and CO (403) is produced. Since the fuel processor catalyst would be damaged if this temperature goes too high, the fuel injection is stopped (404) for some period and the fuel processor allowed to be cooled by the exhaust gas flow (405). When the desired low temperature is reached, then fuel injection is again started (406) and another $H_2$+CO reductant pulse generated.

Similar to the method shown in FIG. 3, when the $NO_x$ trap is fully regenerated, the bypass flow is stopped (407) and the lean trapping cycle begins. This process is then repeated as needed to obtain the desired level of $NO_x$ control. The number of rich pulses can vary from 1 to 10 or more, where the number of rich pulses is determined by the level of regeneration desired and the level of $H_2$+CO generated in each pulse. Similarly, the length of the rich periods and the time allowed for cooling can be varied to obtain the desired fuel processor operating temperature. The temperature of the fuel processor can vary over a wide range, from about 500° C. to about 800° C. In addition, the exhaust oxygen level can vary over a wide range. The 8% shown in this example is merely illustrative.

Although illustrative variations of the present invention have been described above, it will be evident to one skilled in the art that various changes and modifications may be made without departing from the invention. It is intended in the following claims to cover all such changes and modifications falling within the true scope and spirit of the invention.

I claim:

1. A method for reducing emissions using a system having a fuel processor bypass comprising:
   introducing exhaust into an exhaust pipe, the exhaust pipe connected to a bypass pipe, wherein the bypass pipe comprises an inlet, an outlet, and defines a lumen adapted for the passage of gas therethrough, both the inlet and the outlet of the bypass pipe connecting with the exhaust pipe;
   introducing the exhaust into a $NO_x$ trap located downstream of the bypass pipe outlet, wherein the $NO_x$ trap comprises an inlet, an outlet, a $NO_x$ absorbing material, and defines a lumen for the passage of gas therethrough, whereby $NO_x$ in the exhaust are absorbed by the absorbing material;
   opening a valve located at the inlet or outlet of the bypass pipe to regenerate the $NO_x$ trap, such that the entire exhaust flows through the bypass pipe and then the $NO_x$ trap, wherein the valve is configured to move between an open and closed position;
   injecting fuel into the bypass pipe, upstream of a fuel processor located in the bypass pipe between the inlet and outlet, wherein the fuel processor comprises an inlet, an outlet, a catalytic element, defines at least one lumen adapted for the passage of gas therethrough and produces a reducing mixture comprised of CO and $H_2$; and
   introducing the reducing mixture into the $NO_x$ trap, wherein the $NO_x$ trap is located downstream of the bypass pipe outlet; and
   closing the valve to cut the flow to the bypass pipe while maintaining the flow to the $NO_x$ trap.

2. The method of claim 1 where the step of closing the valve maintains the temperature of the catalytic element between a temperature ranging from about 300° C. to about 800° C.

3. The method of claim 1 wherein the catalytic element is preheated to a temperature ranging from about 500° C. to about 800° C.

4. The method of claim 1 wherein the exhaust into the $NO_x$ trap contains excess oxygen when $NO_x$ is being adsorbed by the $NO_x$ trap, and the exhaust into the $NO_x$ trap contains essentially no oxygen when the $NO_x$ trap is being regenerated.

5. A system for reducing the concentration of $NO_x$ in an exhaust stream comprising:
   an exhaust system configured to channel an exhaust flow from an engine through an exhaust pipe to a $NO_x$ trap;
   a bypass pipe configured within the exhaust system, the bypass pipe comprising an inlet, an outlet, and defining a lumen adapted for the passage of gas therethrough, both the inlet and the outlet connecting to the exhaust pipe upstream from the $NO_x$ trap;
   a valve located at the inlet or outlet of the bypass pipe, wherein the valve is configured to move between a first and second position, such that when the valve is in the first position, the entire exhaust flow passes through the bypass pipe, and when the valve is in the second position, the entire exhaust flow is excluded from the bypass pipe;
   a fuel processor positioned in the bypass pipe, comprising an inlet, an outlet, a catalytic element and defining at least one lumen adapted for the passage of gas therethrough; and
   a fuel injector, wherein the fuel injector is located upstream of the fuel processor and is configured to inject fuel into the bypass pipe upstream of the fuel processor;
   wherein the system operates to place the valve in the first position for regenerating the $NO_x$ trap and in the second position when the $NO_x$ trap is not being regenerated;
   whereby the entire exhaust flow passes through the $NO_x$ trap regardless of whether the valve is in the first or second position.

6. The system of claim 5 further comprising a thermal mass located downstream of the fuel processor and upstream of the $NO_x$ trap.

7. The system of claim 5 further comprising a particulate filter, wherein the particulate filter is located downstream of the bypass pipe outlet.

8. The system of claim 5 wherein the fuel processor further comprises a sulfur trapping material.

9. The system of claim 5,
   wherein the catalytic element of the fuel processor comprises two catalysts in series;
   the first catalyst is primarily an oxidation catalyst comprising Ni, Rh, Pd, or Pt; and
   the second catalyst is primarily a reforming catalyst comprising Rh.

10. The system of claim 5 wherein the catalytic element is made of a material selected from the group consisting of ceramic, metal, or mixtures thereof.

11. The system of claim 5 wherein the fuel processor further comprises an insulating mat.

12. The system of claim 5 wherein the fuel processor further comprises a radiation barrier.

13. The system of claim 5 wherein the catalytic element is monolithic.

14. The system of claim 13 wherein the catalytic element has a wall thickness in the range of 10 to 130 microns.

15. The system of claim 5 further comprising a pre-combustor located upstream of the fuel processor and downstream of the fuel injector, wherein the pre-combustor comprises a support material having at least two adjacently disposed longitudinal channels for the passage of gas therethrough, wherein the longitudinal channels have inner surfaces and at least a portion of the inner surfaces of at least one of the channels is coated or impregnated with a catalytic material.

16. The system of claim 15 wherein the pre-combustor is about 0.1 to about 0.7 times the volume of the fuel processor.

17. The system of claim 15 wherein the support material is made at least in part from an iron-based metal alloy.

18. The system of claim 15 wherein the support material is made at least in part from an alloy containing aluminum.

19. The system of claim 15 wherein the support material further comprises a washcoat of zirconium oxide, titanium oxide, hafnium oxide, aluminum oxide, silicon oxide, lanthanum oxide, cerium oxide, magnesium oxide, calcium oxide, strontium oxide barium oxide, chromium oxide, molybdenum oxide, tungsten oxide, or mixtures thereof.

20. The system of claim 15 wherein the hydraulic diameter of the support material channels is about 0.2 mm to about 10 mm.

21. The system of claim 15 wherein the catalytic material of the pre-combustor comprises palladium, platinum, or mixtures thereof.

22. The system of claim 5 comprising at least two fuel processors.

23. The system of claim 22 wherein the at least two fuel processors are of different size.

24. The system of claim 22 comprising at least two bypass pipes, wherein the at least two fuel processors are separately positioned in the bypass pipes.

25. The system of claim 22 wherein at least one fuel processor is in the exhaust pipe, and at least one fuel processor is in the bypass pipe.

26. The system of claim 25 wherein the at least one fuel processor in the exhaust pipe and the at least one fuel processor in the bypass pipe are of different size.

* * * * *